April 22, 1969 — J. F. MATARESE — 3,439,463
EXPANSION AND CONTROL JOINT COVER
Filed Dec. 1, 1967
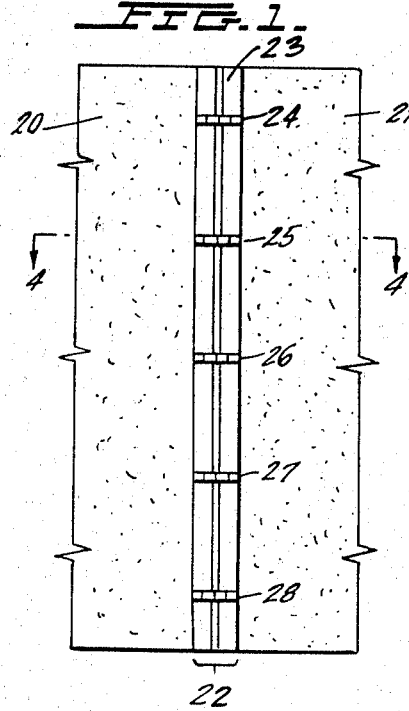
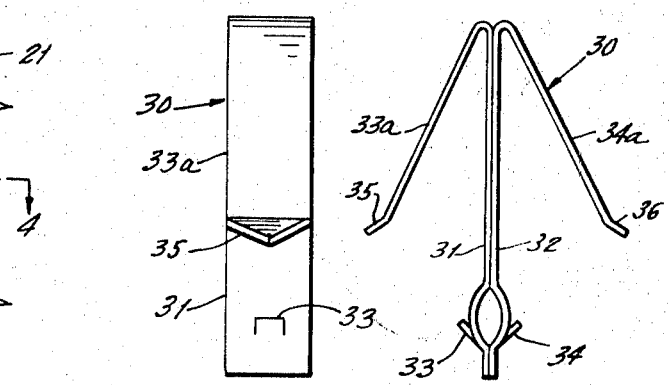
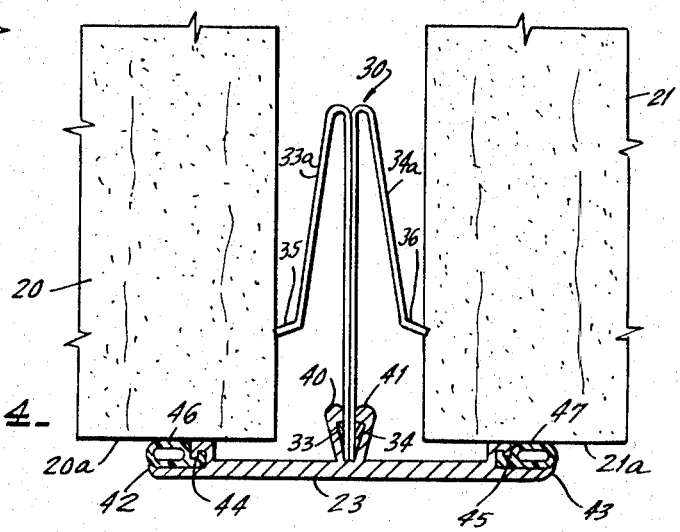
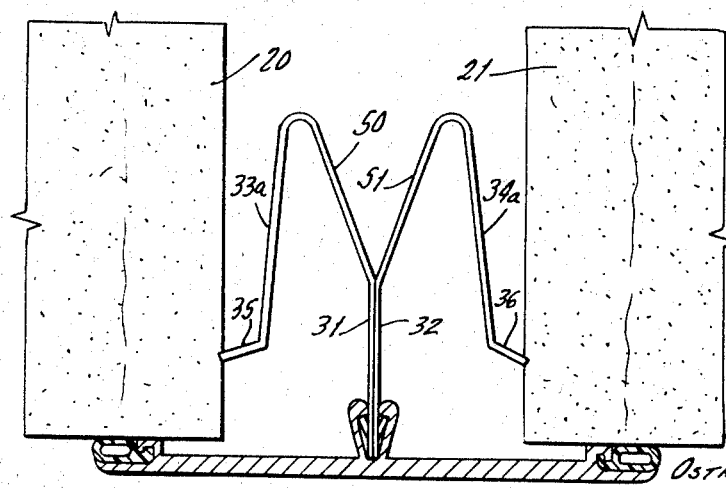
INVENTOR.
JOSEPH F. MATARESE
By
OSTROLENK, FABER, GERB & SOFFEN
ATTORNEYS

INVENTOR.
JOSEPH F. MATARESE
BY
OSTROLENK, FABER, GERB & SOFFEN
ATTORNEYS

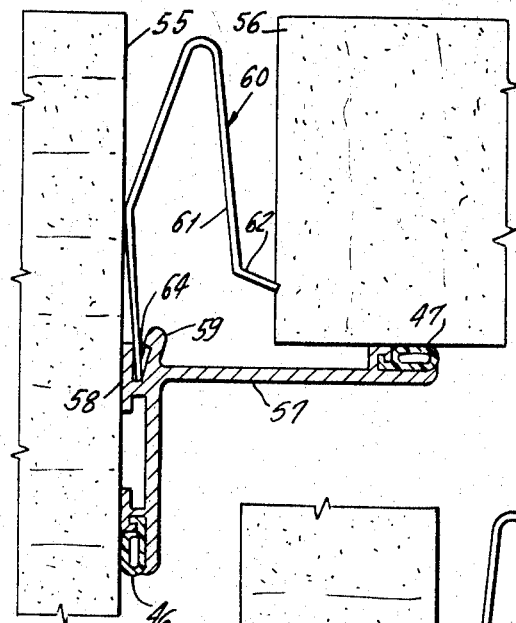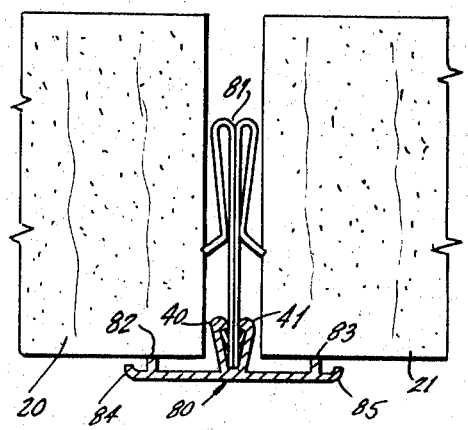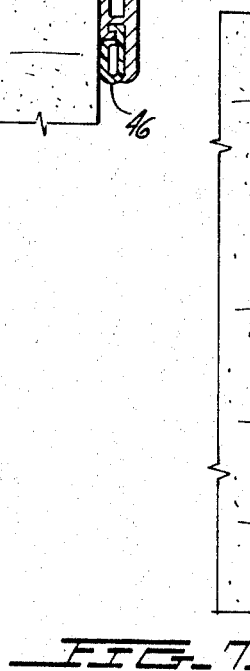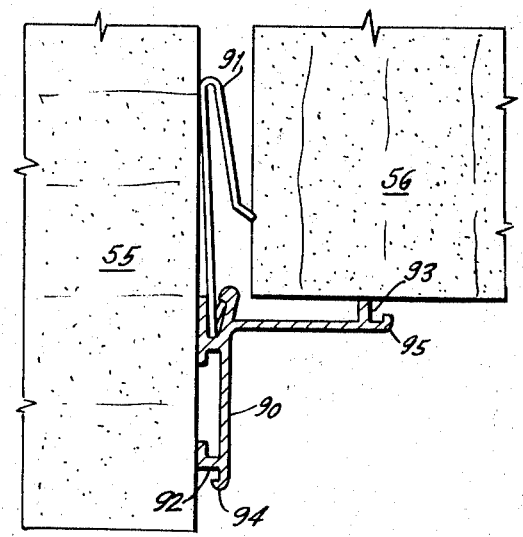

United States Patent Office 3,439,463
Patented Apr. 22, 1969

3,439,463
EXPANSION AND CONTROL JOINT COVER
Joseph F. Matarese, Hill Road, Burlington Township,
Burlington, N.J. 08016
Filed Dec. 1, 1967, Ser. No. 687,366
Int. Cl. E04b 2/10, 5/00; E04c 5/16
U.S. Cl. 52—288                    7 Claims

ABSTRACT OF THE DISCLOSURE

A construction control joint comprising an extruded cover which receives snap-in clips along its length. The snap-in clips have extending arms which grip one or both walls of the joint being covered.

---

This invention relates to wall and ceiling construction control joints and joint covers, and more specifically relates to a snap-in type extruded joint cover which can be snapped into the spacing between structural members, thereby to enclose the space while permitting relative expansion and construction within the space without causing fractures of the expanding and contracting body.

Control joint covers are well known to the art, and are described, for example, in U.S. Patent 3,066,451 to Petty. Control joint covers of this type have the disadvantage of requiring a substantial amount of labor in their construction and installation since they require the formation of openings in the cover members and provision of cross-connecting straps which must be connected to these covers. Expansion joint covers are also known, as shown in U.S. Patent 2,976,782 or 2,948,994. The general distinction between control joints and expansion joints is that the former permits small relative movements while the latter permits larger relative movement. In the following, each shall be generally described as construction control joints."

The principle of the present invention is to provide a novel joint cover which can be easily installed by unskilled personnel without the need for special tools or extended labor time, and which requires no finishing work on the manufactured cover after the extrusion thereof, other than cutting the structure to its desired length.

Moreover, the present invention permits the installation of joint covers even though the spacing between adjacent building structures which is to be covered has been pre-filled with some filling compound.

In accordance with the present invention, an extruded elongated member is provided with a central extending section having two opposing re-entrant sections defining a pair of inwardly projecting hooks extending completely along the length of the cover. A plurality of simple spring clips having outwardly extending projectons at one end thereof are then provided which can be snapped into the opposing hooks of the cover.

The opposite ends of the anchors then have reentrantly arranged outwardly flaring arms which are self-biased outwardly and into engagement with the opposing blocks or other suitable support structures which are to receive the cover.

Thus, the anchors can be clipped into the extruded cover at selected distances along its length in a simple manner with the complete assembly thereafter being forced into the spacing which is to be covered with the self-biasing projecting arms of the anchors holding themselves and thus the covers within the space. If desired, the outwardly extending arms may be provided with sharpened points which dig into the opposing surfaces of the space which is to be covered.

As a further feature of the invention, the opposite ends of the cover abutting the surfaces of the walls defining the space which is to be covered may be further provided with a partially enclosed configuration which can slidably receive an elongated hollow plastic seal. Thus, the plastic seal will form a soft surface connection between the opposite edges of the cover and the walls which are spanned by the cover, and provides an attractive finishing appearance. It also serves as a seal and keeps out dust and moisture.

Moreover, if desired, the opposing edges of the cover can have an inwardly spaced extension which seats against the wall surface along with an inwardly curved end surface spaced from the wall which provides an attractive appearance even though the wall is irregular and the ends of the cover are spaced by variable distances from the wall along the length thereof.

The inwardly curved end section of the cover has been found to provide an extremely advantageous shadow effect which serves to hide the otherwise variable spacing effect that would be noticeable to the eye.

Accordingly, a primary ebject of this invention is to provide a novel structural joint cover which can be easily installed.

Another object of this invention is to provide a novel structural joint cover or column closure which is inexpensive in manufacture.

Another object of this invention is to simplify the installation and construction of control joint covers and column closures.

These and other objects of this invention will become apparent from the following description when taken in connection with the drawings, in which:

FIGURE 1 is a sectional view of an upwardly extending space between two walls which is covered by a control joint cover constructed in accordance with the invention looking inwardly from behind the cover so that the anchor clips are visible.

FIGURE 2 is a front plan view of a typical anchor clip which can be used in accordance with the invention.

FIGURE 3 is a side view of the clip of FIGURE 2.

FIGURE 4 is a cross-sectional view of FIGURE 1 taken across the line 4—4 in FIGURE 1 to illustrate the shape of the novel extrusion of the present invention and the manner in which the extrusion can receive its spring clip anchors.

FIGURE 5 is similar to FIGURE 4 and illustrates the use of a modified spring clip for a cover which must cover a larger gap than that of FIGURE 1.

FIGURE 6 illustrates the manner in which the invention can be applied for the covering of a corner joint.

FIGURE 7 is similar to FIGURE 6, and illustrates a modification of a spring clip for a wider corner joint spacing.

FIGURE 8 is similar to FIGURE 4, and illustrates a modification of the extrusion structure for the provision of a shadow effect in the absence of an edge seal.

FIGURE 9 is similar to FIGURE 6, and illustrates a modified spring clip anchor with the extrusion similarly modified for obtaining the shadow effect of FIGURE 9.

Figure 3A:
FIGURE 3a is a perspective view of a portion of the clip of FIGURE 3.

Referring first to FIGURE 1, I have illustrated therein a rear view of two structural members such as walls 20 and 21. It is common practice in the construction industry to provide a spacing between the end of the blocks forming the walls so that room is permitted for the expansion of these walls without causing cracks. In FIGURE 1, the walls are spaced by the spacing 22 which could, for example, be one or more inches for the case of an expansion joint or ⅜" for the case of a control joint.

It is common practice to either fill this space with a suitable compound which can flex to permit the walls to expand and contract, although this technique creates a relatively unsightly joint and requires an expensive caulking operation. Alternatively, it is known to cover the space 22 with a metallic cover which spans across the outer surfaces of walls 20 and 21. The present invention is directed to an improvement in this type of cover.

Thus, in FIGURE 1, the inside of an elongated cover 23 is shown which extends along the full height of the space 22. This cover structure, which will be described more fully hereinafter in detail, has previously been affixed to the walls 20 and 21 through the provision of complex bracing members, as described in the patent to Petty 3,066,451, and requires the machining of suitable openings within the extruded member 23 and complicated on-site installation techniques.

In accordance with the present invention, the extruded member 23 is provided with means for the simple reception of spring anchors, shown in FIGURE 1 as spring anchors 24 through 28, which are spaced along the length of cover 23 by suitable spacings and which can be inserted into the cover 23 in a simple manner and without provision of special tools.

FIGURES 2 and 3 illustrate a typical spring anchor which is used in accordance with the present invention. Referring to FIGURES 2 and 3, the spring clip anchor 30 is made of stainless steel having a thickness of approximately 0.030 inches. The clip 30 can be made of two sections 31 and 32 which are identical to one another and are provided with projecting tangs 33 and 34 which could be punched from the bodies of members 31 and 32. The tangs 33 and 34, as will be seen more fully hereinafter, are designed to have a height and bending angle sufficient to accommodate inwardly projecting surfaces extending from the extruded body of the cover 23. Thus, they can be connected to the cover 23 either by directly pressing them into their locking surface or by sliding them down the length of the cover to their desired location.

The outer ends of springs 31 and 32 then have re-entrantly bent sections 33a and 34a which have upwardly projecting sharpened tips 35 and 36 which are adapted to dig into the opposing block surfaces defining the space 22.

Note that spring clips of the types of FIGURES 2 and 3 would first be assembled on a cover, with the assembly thereafter being pressed into space 22 of FIGURE 1 with the upper rounded nose of the spring clips first entering space 22 and the sharpened upwardly bent tips 35 and 36 engaging the walls, but being deflected inwardly to permit continued inward movement of the clips into space 22.

As soon as the cover is completely installed in position, the upwardly bent tips 35 and 36 will tend to prevent the outward motion of the spring clips from the space 22, since they will dig into the surfaces defining the space when moved backwardly.

It has been found useful to bow clips 31 and 32 outwardly adjacent tangs 33 and 34 as shown in exaggeration in FIGURE 3, to help set tangs 33 and 34. FIGURE 3a shows how clip 32 can be formed with such a bow by lancing out portion 34a.

FIGURE 4 illustrates the cover 23 in cross-section when assembled with the spring clip 30. As best seen in FIGURE 4, the shape of cover 23 is one which lends itself to simple extrusion techniques, and is provided with a pair of centrally raised hook sections 40 and 41 which latchably receive tangs 33 and 34 of the anchor 30. Note that the hook sections 40 and 41 bend inwardly to seat over the top of tangs 33 and 34.

The ends of cover 23 then define a partially closed section including inwardly bent end sections 42 and 43 and outwardly bent sections 44 and 45. These bent sections define a securing seat for hollow extruded vinyl seals 46 and 47, respectively, which are securely received at the ends of cover 23 and seat against front surfaces 20a and 21a of wall sections 20 and 21. Thus, the seals 46 and 47 define a relatively good seal between the cover and the walls 20 and 21, even though the wall surfaces may not be perfectly flat.

It will be understood from FIGURE 4 that the pre-assembled extrusion 23, which includes the seals 46 and 47 and spaced anchor clips such as anchor clip 30, can be directly pressed into the space between wall sections 20 and 21 with the pre-assembly and actual connection to the wall taking a minimum of time, even by inexperienced personnel.

Once the section is installed, the spring clip ends 35 and 36 will dig into the opposing surfaces of walls 20 and 21, thereby to defeat the outer movement of the cover, while permitting relative movement of the walls which tend to close or open the space between them.

The spring clip structure shown in FIGURE 4 is particularly suitable to virtually any installation of an expansion joint cover. Some changes, however, are desirable under certain conditions as, for example, where the wall spacing between walls 20 and 21 is increased from approximately 1 inch for the case of FIGURE 4 to approximately 2 inches, as shown in FIGURE 5.

Referring to FIGURE 5 where like components have been given similar identifying numerals, it will be noted that the wall spacing between walls 20 and 21 is so large that the spring clip 30 would have to be made inconviently large in order to have a good biting action between the ends 35 and 36 of the spring clip and the wall surfaces.

Accordingly, in FIGURE 5, the spring sections 31 and 32 are outwardly bent from one another at regions 50 and 51 with the anchor clips connected together as by welding from a point below the point where sections 50 and 51 diverge from one another. In all other respects, however, the structure and operation are identical to that shown in FIGURE 4.

FIGURE 6 illustrates the manner in which the invention can be applied to a corner joint, or a joint where a first wall 55 extends perpendicularly or at some angle other than zero degrees with respect to a second wall 56. In this type application, the extruded cover 57 has the L-shape illustrated with the ends of the L-shaped cover abutting the surfaces of walls 55 and 56 having the configuration of that of FIGURES 4 and 5 in receiving the seals 46 and 47, as in FIGURE 5.

In FIGURE 6, however, the corner of the L-shaped member 57 has an extending pad surface 58 and an extending hook member 59 which are integral parts of the extrusion. The spring clip structure is then modified to the shape shown for spring clip 60 in FIGURE 6 which is a single spring clip having an extending tank 61 captured between pad 58 and hook 59.

A re-entrantly bent section 61 having an upwardly turned hook portion 62 then engages the surface of wall 56, thereby to hold the L-shaped cover 57 in position with respect to walls 55 and 56. Clearly, the installation of the structure of FIGURE 6 will be substantially identical to that described in FIGURES 4 and 5.

In FIGURE 6, the spacing between wall 55 and 56 which was to be covered is considered to be of the order of 1 inch. Where this spacing increase is, for example, to 2 inches, it is preferable to modify the cover 57 in the manner shown in FIGURE 7.

Thus, in FIGURE 7, the spacing between walls 55 and 56 is increased to approximately 2 inches, while the L-shaped cover 70 is modified from the cover 57 of FIGURE 6 to have extending hook members 71 and 72

(similar to hooks 40 and 41 of FIGURES 4 and 5) which receive a spring 73 which is identical to that of FIGURE 5.

Thus, the spring clips of FIGURES 5 and 6 are interchangeable with various types, thereby permitting the use of the same spring structure in different applications so that inventory problems are somewhat reduced.

In FIGURES 4 through 7, it has been presumed that the specifications require that the cover be sealed to the surface of the walls receiving the cover. In many instances, however, the expense of the seals can be eliminated, and the edge or end structure of the covers can be modified in a novel manner to provide a shadow effect, whereupon irregularities in the flatness of the wall surfaces are masked.

FIGURE 8 illustrates the use of the novel cover 80 which incorporates a spring clip 81 substantially identical to that described in FIGURE 4 which holds the cover 80 into position and over the spacing between walls 20 and 21.

The extrusion 80 thus has the upstanding latch members 40 and 41 in the usual manner, but in place of the extrusion configuration for receiving vinyl seals 46 and 47 in FIGURES 4 and 5, a pair of inwardly extending legs 82 and 83 spaced from the edges of cover 80 are provided which have a length of approximately 1/8 inch. The outside ends 84 and 85 of cover 80 are then inwardly turned for a short distance less than the length of extending legs 82 and 83 which seat against the wall surfaces of walls 20 and 21.

The effect of the inwardly turned ends 84 and 85 in combination with legs 82 and 83 is to provide a shadow effect such that even though the wall surfaces of walls 20 and 21 are not regular and the legs 82 and 83 leave the wall surface at various locations, this will be masked by the shadow effect due to inward projections 84 and 85 so that an unsightly gap will not be visible.

FIGURE 9 illustrates the manner in which the shadow effect structure at the edge of the cover 80 could be applied to an L-shaped cover 90 which is identical in configuration to that of FIGURE 6, and uses a spring clip anchor 91 which is identical to one-half of the spring clip anchor of FIGURES 2 and 3.

In FIGURE 9, however, the seals 46 and 47 of FIGURE 6 have been replaced by projecting legs 92 and 93 which seat against the wall surfaces of walls 55 and 56 and are masked by inwardly projecting ends 94 and 95 which provide the shadow effect described above.

Figure 10:
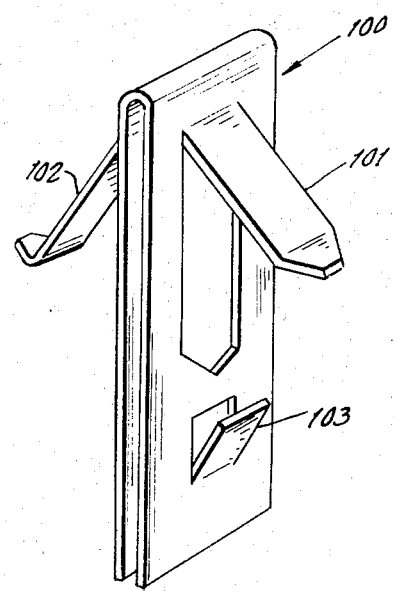
FIGURE 10 shows a further embodiment of a spring clip structure.

FIGURE 10 shows the manner in which a spring clip of the type shown in FIGURE 3 can be formed of a single strip of material. Thus, a single strip 100 is first punched, while flat, to obtain extending arms 101 and 102 and extending tangs 103 and a second tang under arm 102 which is not shown. Thereafter, strip 100 is bent to the form shown.

Figure 11:
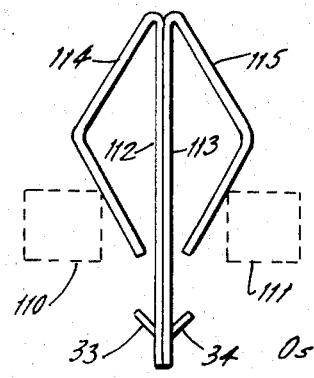
FIGURE 11 shows a still further embodiment of the invention.

FIGURE 11 shows a further clip structure which can be used when wood blocking or metal is formed in the joint, shown schematically as studs 110 and 111 (or an equivalent plaster wall or the like) in dotted lines. In this case, the clip can be similar to the clip of FIGURE 3, except that clips 112 and 113 have bent arms 114 and 115 which spring outwardly and behind blocks 110 and 111 when inserted into the joint, to be held therein by spring pressure.

Although this invention has been described with respect to its preferred embodiments, it should be understood that many variations and modifications will now be obvious to those skilled in the art. For instance, it may be desirable in certain environments for the cover to lie substantially flush against the two surfaces which define the space to be covered. In this type of situation, the cover need not include either the seals of FIGURE 4 nor the ribs of FIGURE 8. The essential concept of the invention is not in the details of construction of the cover nor in the detailed type of spring clip used. The concept is, rather, one of covering a space defined between two members by a cover which is held against such members by simple connection means which are easily joined to the rear of the cover at one end, and provided at the other end with some type of spring biased retaining means for permitting easy insertion of said connection means in said space, but preventing easy withdrawal of said connection means. It is preferred, therefore, that the scope of the invention be limited not by the specific disclosure herein, but only by the appended claims.

The embodiments of the invention in which an exclusive privilege or property is claimed are defined as follows:

1. A joint cover for covering the space between spaced opposing surfaces of first and second structures; said space having a predetermined length and a predetermined width; each of said first and second structures having respective front surfaces generally perpendicular to their respective opposing surfaces; said joint cover comprising:

a generally flat member having a length approximately equal to said predetermined length and a width greater than said predetermined width, said member having first and second edges, a front surface, and a rear surface, said rear surface having first and second centrally disposed, longitudinally extending raised hook-shaped sections integral with said cover; said first and second hook-shaped sections spaced from one another and facing one another; and a plurality of anchor springs longitudinally spaced from one another and extending outwardly from said rear surface of said member, each of said anchor springs having an extending tang engaging one of said first or second raised hook-shaped sections of said rear surface at a first end thereof, each of said anchor springs having a flexible re-entrant section extending laterally and backwardly from the end of said anchor spring opposite said one end, each said flexible re-entrant sections having a respective engaging portion for engaging the said opposing surface of said first extended structure, thereby to rigidly secure said cover to said first extended structure; said first and second edges overlapping and generally engaging the said front surfaces of said first and second structures.

2. The device as set forth in claim 1 wherein said engaging portion of said anchor springs comprises the end of said re-entrant section; said end of said re-entrant section having an upturned tip engaging said opposing surface of said first extended structure at an interior angle less than 90° as measured when rotating a line, extending from the point of engagement of said tip and away from the said front surface of said first structure, from said opposing surface toward said re-entrant section.

3. The device as set forth in claim 1 wherein said first and second front surfaces of said first and second structures are parallel.

4. The device as set forth in claim 1 wherein said first and second front surfaces of said first and second structures are perpendicular.

5. The device as set forth in claim 1 which includes a second plurality of anchor springs secured to a respective one of said plurality of anchor springs; each of said second plurality of anchor springs identical to those of said plurality of anchor springs and connected to the other of said first or second hook-shaped sections; the re-entrant section of each of said second plurality of anchor springs engaging said opposing surface of said second structure.

6. The device as set forth in claim 1 which includes a first and second longitudinally extending rib on said rear surface engaging said front surfaces of said first and second structures, respectively, closely spaced from said first and second edges, respectively; said first and second edges being inwardly turned away from said front surface, for a distance less than the height of said first and second ribs, thereby to form a shadow effect at said edges of said cover.

7. A joint cover for covering the space between spaced opposing surfaces of first and second structures; said space having a predetermined length and a predetermined width; each of said first and second structures having respective front surfaces generally perpendicular to their respective opposing surfaces; said joint cover comprising:
- a generally flat member having a length approximately equal to said predetermined length and a width greater than said predetermined width, said member having first and second edges, a front surface, and a rear surface;
- connection means extending from said rear surface to said opposing surfaces of said first and second structures for connecting said cover across said space;
- a first and second longitudinally extending rib on said rear surface engaging said front surfaces of said first and second structures, respectively, closely spaced from said first and second edges, respectively; said first and second edges being inwardly turned away from said front surface, for a distance less than the height of said first and second ribs, thereby to form a shadow effect at said edges of said cover.

References Cited

UNITED STATES PATENTS

| | | | |
|---|---|---|---|
| 2,948,994 | 8/1960 | Thom | 52—278 |
| 3,102,612 | 9/1963 | Dunnington | 52—464 |
| 3,212,224 | 10/1965 | Spangenberg | 52—127 X |
| 3,270,474 | 9/1966 | Driggers | 52—395 |
| 3,331,171 | 7/1967 | Hallock | 52—395 X |
| 3,378,973 | 4/1968 | Tudor-Pole | 52—288 X |

FOREIGN PATENTS

| | | |
|---|---|---|
| 921,244 | 1/1947 | France. |
| 1,293,103 | 4/1962 | France. |
| 556,249 | 9/1943 | Great Britain. |
| 990,903 | 5/1965 | Great Britain. |

ALFRED C. PERHAM, *Primary Examiner.*

U.S. Cl. X.R.

52—278, 395, 466, 311